United States Patent [19]

Shmuter et al.

[11] Patent Number: 4,758,967

[45] Date of Patent: Jul. 19, 1988

[54] COMPUTER SIMULATED INERTIA FOR MOTOR VEHICLE POWERTRAIN TESTING

[75] Inventors: Shimshon Shmuter, Birmingham, Mich.; Hossein Nivi, Windsor, Canada; Veljko Milenkovic, Birmingham; Nathaniel Field, Northville, both of Mich.

[73] Assignee: Ford Motor Company, Dearborn, Mich.

[21] Appl. No.: 861,902

[22] Filed: May 12, 1986

[51] Int. Cl.$^4$ .................. G05B 15/00; G01L 3/22
[52] U.S. Cl. .................... 364/550; 364/511; 364/579; 73/862.09; 73/862.18; 73/862.19; 73/117
[58] Field of Search .............. 364/431.01, 511, 550, 364/424.1, 578, 579, 801, 150, 151; 73/116, 117.1, 862.17, 862.19, 862.29, 862.31, 862.09, 862.18, 117

[56] References Cited

U.S. PATENT DOCUMENTS

| | | | |
|---|---|---|---|
| 3,651,690 | 3/1972 | Pagdin et al. | 73/117 |
| 4,057,714 | 11/1977 | Fork et al. | 264/494 |
| 4,161,116 | 7/1979 | Fegraus et al. | 73/117 |
| 4,231,092 | 10/1980 | Grob et al. | 364/431 |
| 4,235,103 | 11/1980 | Carter et al. | 73/168 |
| 4,300,205 | 11/1981 | Tansuwan | 364/578 |
| 4,327,578 | 5/1982 | D'Angelo | 73/862.18 |
| 4,382,388 | 5/1983 | Ono | 73/862.18 |
| 4,578,747 | 3/1986 | Hideg et al. | 364/151 |
| 4,621,524 | 11/1986 | Von Thur | 73/116 |
| 4,638,673 | 1/1987 | Blashke | 73/862.17 |

*Primary Examiner*—P. S. Lall
*Assistant Examiner*—Steven A. Melnick
*Attorney, Agent, or Firm*—Frank G. McKenzie; Donald J. Harrington

[57] ABSTRACT

The large rotational inertia applied to a driveline component during normal driving conditions is simulated in a test stand that contains a component that driveably connects an input motor and an output motor. A computer repetitively executes an algorithm that produces a commanded torque signal which is supplied as a control signal to the motor drive of one of the electrical motors to produce an output within that motor equal to the commanded torque. The control system applies to the powertrain component under test an inertia that simulates the actual vehicle inertia. The target state of the system, when the vehicle inertia is applied, is completely defined from information known when the component being tested has substantially less inertia applied.

7 Claims, 2 Drawing Sheets

COMPUTER SIMULATED INERTIA FOR MOTOR VEHICLE POWERTRAIN TESTING

BACKGROUND OF THE INVENTION

1. Field of the Invention.

This invention relates to the testing of driveline components, in particular components having a large, variable inertia applied during normal operating conditions or during test conditions. More particularly still, this invention relates to a control system that accurately simulates the application of a large inertia to such a component during test conditions.

2. Description of the Prior Art.

The results produced by quality control testing of a torque transmitting, rotating component tested before its assembly in a motor vehicle will be more indicative of its performance under normal conditions if the dynamic conditions under which the test is conducted represent closely the actual operating conditions. One dynamic condition in which current test practice deviates substantially from vehicle conditions involves the inertia applied to the tested component. Ordinarily, a flywheel is provided which represents only a fraction of the large inertia of the vehicle, perhaps only 20–50% of the actual inertia. The size of the flywheel that would represent the entire vehicle inertia is unmanageably large. The time required to accelerate such an enormous mass to the desired velocity is prohibitively excessive, particularly so when tests are conducted in a high volume production environment such as a modern factory. Therefore, large inertia flywheel,s, even if they could be implemented successfully, are not used. To shorten the test cycle, smaller inertia masses have been used, but these do not represent sufficiently well the actual operating conditions.

A transmission responds to torque and velocity and to the time rate of change of these variables applied to both the input and output shafts of the transmission. Physical inertia imposes a proportional relationship between torque and acceleration, but the same relationship can be achieved by other means.

If a motor is fully controllable, any torque within its rating can be achieved independently of velocity or acceleration Proper control strategy can achieve any desired relationship between torque and acceleration including one which simulates inertia of arbitrary magnitude subject to the rated torque limits of the motor.

SUMMARY OF THE INVENTION

A system for testing components to which a variable virtual inertia is applied to the component, in accordance with the strategy and control system of this invention, includes an input motor driveably coupled to one end of the component and an output motor driveably connected to the opposite end of the component. The output torques of the motors are applied in opposite rotational directions to the components. At least one of the motors has the capacity to respond rapidly to a variable torque command. The system includes sensors that produce signals representing the current rotational speed, acceleration and torque of the component. A computer having fast real time, arithmetic processing capabilities and data acquisition is supplied with the signals transmitted by the sensors and a signal representing the output torque commanded of one of the motors that will simulate the virtual inertia The strategy includes sampling of the sensor data at a rate of nearly 1,000 times per second, performing certain calculations and issuing updated control commands to the motor at an interval of 40–60 ms. The computer is programmed with an algorithm that repetitively calculates a torque correction on the basis of the current torque transmitted by the component, the current acceleration of the component, the current output torque of the controlled motor, the effective inertia of the motor whose output is uncontrolled, and the virtual inertia that will be simulated by the control system. The algorithm decides whether the relation between the torque and acceleration agrees with the condition that characterizes the inertia being simulated. On the basis of the magnitude of the difference between these values, the algorithm issues a correction command that readjusts the output torque of the controlled motor to simulate the effective virtual inertia.

The control strategy is set forth in an algorithm that is stored in computer memory for repetitive execution. The strategy recognizes that if certain conditions characterizing the current state of the drive system are known then the state of the system operating with a higher or lower inertia is also completely defined, provided certain measurable or predetermined parameters are specified. Specifically, the torque transmitted by the component under test is equal to the torque applied to the component by the input motor minus the resistance torque associated with the input motor, which resistance torque is equal to the product of the inertia of the motor and the acceleration of the drive system component. The torque transmitted by the component is also equal to the torque applied to the component under test plus the sum of the inertia associated with the output motor times the acceleration of the component. When these variables are known, execution of the computer algorithm repetitively produces a torque correction that is transmitted from an output port of the computer to the motor drive of the output motor in the form of an analog or digital signal whose magnitude varies between plus and minus 10 volts. The motor drive converts that signal to the commanded output torque whose magnitude simulates the effect of a large rotating inertia located between the input motor and the output motor and driven by the tested component.

The drive system and the control can be equally as well applied when the component being tested is a transmission, a driveshaft or any other component capable of being supported rotatably to transmit a torque between the input motor and the output motor.

DESCRIPTION OF THE PREFERRED EMBODIMENT

Figure 1:
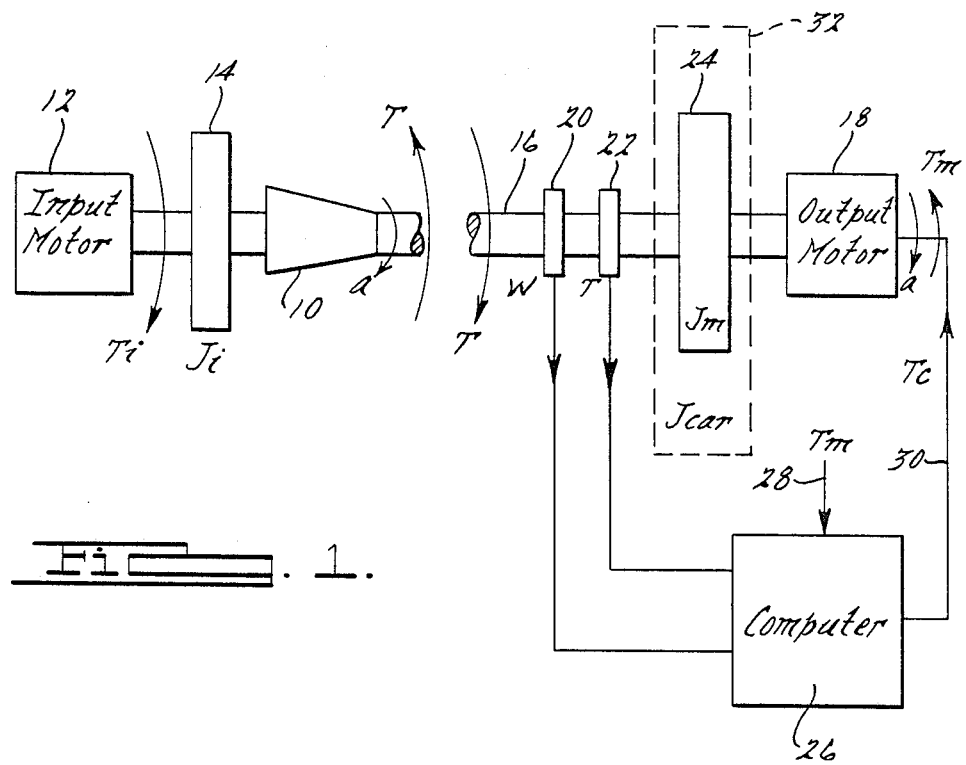
FIG. 1 shows schematically the components of motor vehicle powertrain and the test and control equipment that may operate under the control of this invention.

Referring first to FIG. 1, the transmission 10 of an automotive powertrain, located at a test station within a transmission manufacturing plant, is tested under load to determine if its performance meets performance criteria before it is assembled in a motor vehicle. The transmission is driven by an input motor 12, whose rotational inertia Ji about the axis of the shaft that connects the motor and the transmission input is represented by disc 14. The transmission output shaft 16 is connected to an output motor 18 through a velocity, displacement or acceleration transducer 20 and a torque transducer 22. The rotational inertia of the output motor Jm about the axis of shaft 16 is represented by disk 24. The signals produced by transducers 20 and 22 are supplied as input to a computer 26. Transducer 20 produces a signal representing the speed of shaft 16 from which the displacement and acceleration of the shaft may be determined. Transducer 22 produces a signal representing the torque carried by shaft 16. Also supplied as input to the computer is a signal, Tm, which is a road load, braking or driving command, currently used by the motor drive of motor 18 to produce an output torque applied to shaft 16 by that motor. The computer has stored in memory accessible to the central processing unit an algorithm from which can be calculated the torque correction, Tcor, which updates the previous command, Told, to produce as output a new torque command, Tc. The new torque command signal is carried on line 30 to the output motor drive. In response to the new torque command, the output motor drive produces a new output torque signal, Tm, from which the motor develops an output torque that resists the torque produced by the input motor. The torques applied to shaft 16 maintain the relationship between the acceleration of the shaft and the torque, T, carried by the shaft as would be produced if the vehicle were operating under driving conditions with the vehicle inertia, Jcar, represented by the phantom or virtual rotating disk 32.

In FIG. 1, the driveline is separated into two free body diagrams. The first of these, located at the left-hand end of shaft 16, includes input motor 12, the input inertia 14 and the transmission 10. The torque T is the torque transmitted by shaft 16.

A second free body diagram, located at the right-hand end of shaft 16, includes the output motor 18, the output inertia 24 and shaft 16. Torque T is applied to the end of shaft 16, in the opposite direction from the direction it is applied to the free body diagram of the left-hand end.

The torque T carried by shaft 16 is equal to the torque produced by the input motor, Ti, minus the torque resistance, $Ji*a$, associated with the input inertia 14, where a is the angular acceleration of the shaft. Torque T accelerates the output inertia 24 and opposes the torque produced by the output motor, Tm. The expression relating these torques, inertias and angular accelerations is $$Ti - Ji(a) = T = Jm(a) + Tm \quad (1)$$

Figure 3:
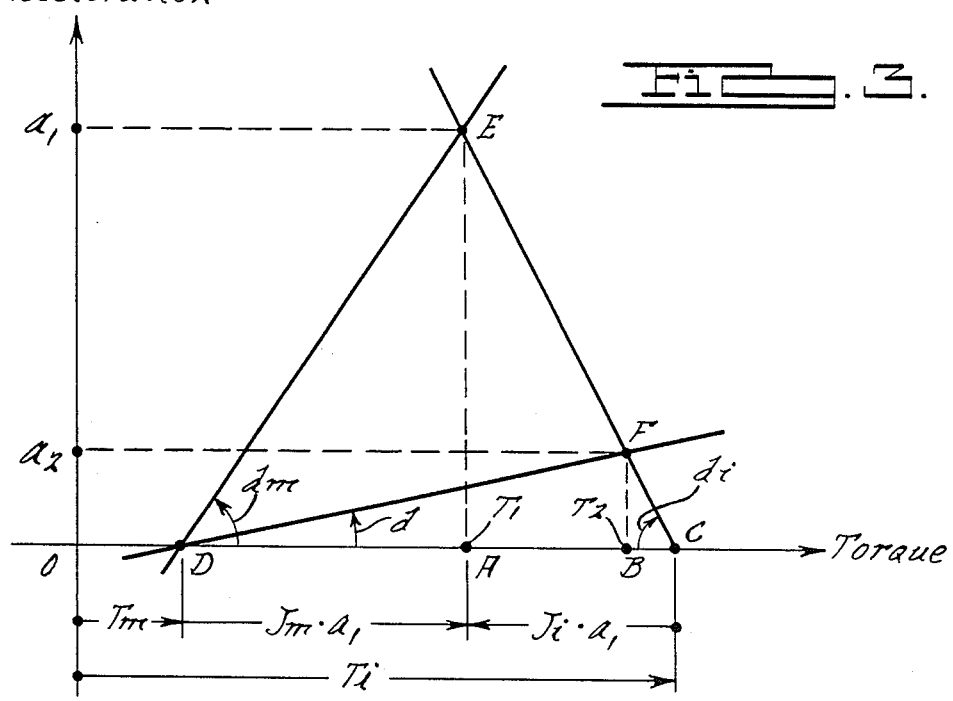
FIG. 3 is a diagram that illustrates the variables used by the computer algorithm that calculates the torque correction value for the system according to this invention.

This relationship is illustrated in FIG. 3 as point E, where the coordinates a1, T1, represent the acceleration and torque of shaft 16, the output motor torque is TM, and inertias Jm and Ji are carried by the shaft. Notice that the angles di and dm, which determine the acceleration torque ratio, are functions of the respective inertias, J.

$$J = 1/\tan(d) \quad (2)$$

If the powertrain represented in FIG. 1 were operating in a motor vehicle, the powertrain would react to variations in torque in the same way as indicated by equation (2), except that the inertia of the vehicle or virtual inertia, Jcar, would be substituted for Jm. Point F whose coordinates are a2, T2, represents the preferred combination of angular acceleration to which the powertrain should operate as a result of the torque T2. Therefore, the coordinates of point E are the current angular acceleration and torque at which the powertrain system is operated and the coordinates of point F are the target acceleration and torque which the control system of this invention will produce.

The coordinates of point E, the current state of the system, are supplied as input to the computer from the transducers 20 and 22, respectively. The current torque of the output motor 18 is supplied as input to the computer. The diagram of FIG. 3 shows that when the coordinates representing the current state of operation of the powertrain and the torque of the output motor are known, then the equivalent target state of the powertrain system is also completely defined by the known values and two additional constants, Ji and Jcar. The relationship between angle di and Ji and between angle dcar and Jcar are $$Ji = 1/\tan di$$
$$Jcar = 1/\tan(dcar) \quad (3)$$

An additional motor torque, represented by the distance between point A and point B, $$AB = T2 - T1 \quad (4)$$

is needed to convert the current state of the system to the target state.

The torque correction command Tc can be expressed as a function of the current coordinates. The length of lines DC and AC can be determined from triangle DEC if the magnitude of a1, T, Tm and d5 are known. The length of line BC can be determined from triangle DFC knowing dcar, di and DC. Then the magnitude represented by the length of line AB is $$AB = (AC - BC) \quad (5)$$

From this information an algorithm can be written in a suitable computer programming language that will enable the computer to repetitively calculate the motor torque correction command Tc, whose magnitude is represented by the length of line AB. The magnitude of the torque correction command has the effect of producing an angular acceleration a2 and a torque T2 which will be the equivalent of the reaction of the powertrain system if the full vehicle inertia or virtual inertia, Jcar, were driven by shaft 16.

The torque correction command can be stated in terms of multipliers $$Tcor = AL_a(a) - AL_T(T - Tm) \quad (6)$$

where $$AL = Ji \, Jcar/Ji + Jcar \quad (7) \text{ and}$$

$$AL_T = Ji/Ji + Jcar \quad (8)$$

The computer 26 has stored within its memory an algorithm that incorporates the strategy described with respect to FIG. 3. The algorithm produces a torque command for the motor drive of the output motor 18 in the form of an analog voltage signal that varies in magnitude between −10 volts and +10 volts. This signal is converted by the motor drive to produce Tm.

Figure 2:
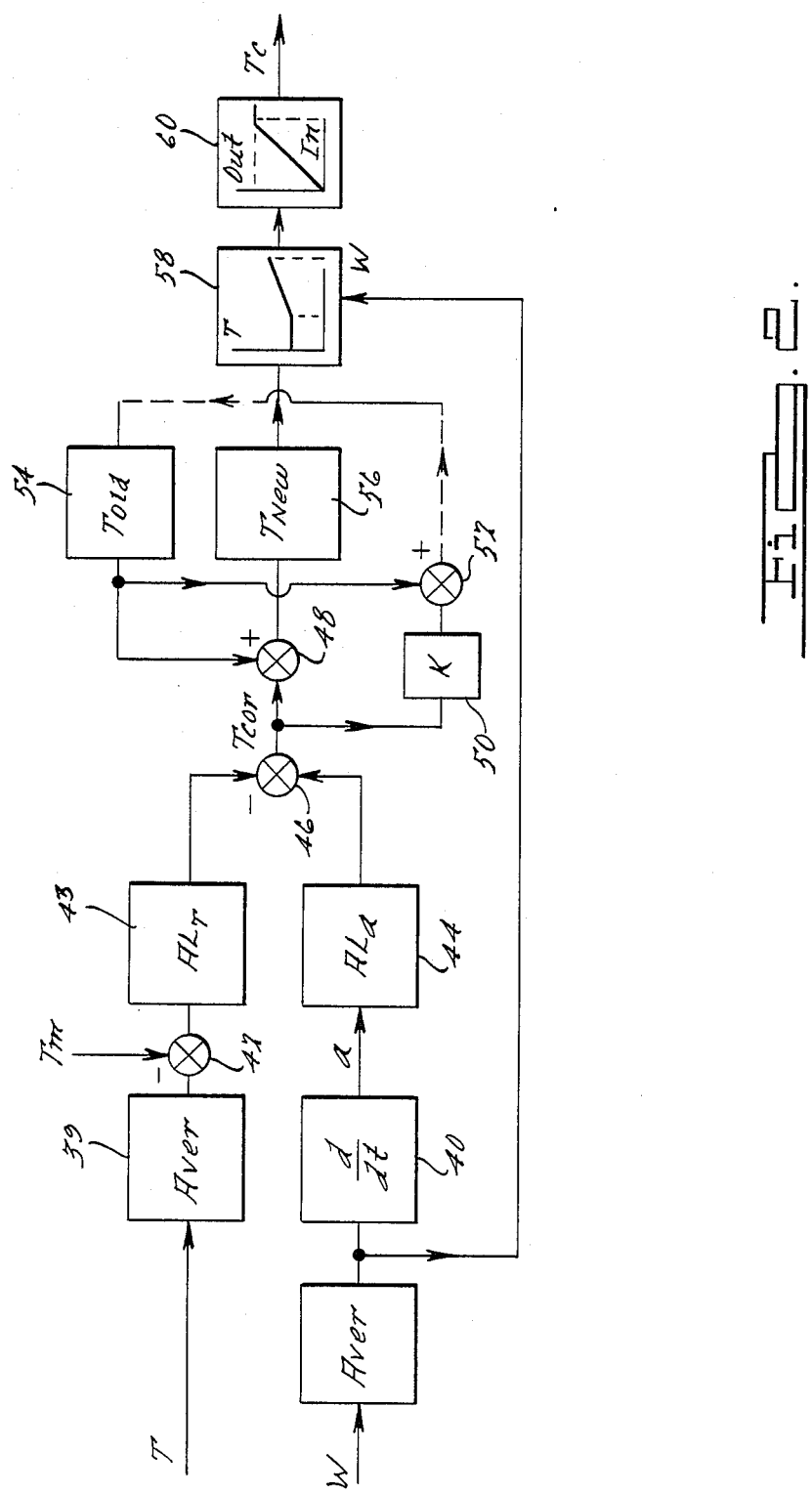
FIG. 2 is a functional block diagram of the feedback control system according to this invention.

FIG. 2 illustrates the process by which the algorithm converts the input information T, W, and Tm to produce Tc. The algorithm is repetitively executed within the computer and its output signal is converted to the analog voltage signal that is supplied to the motor drive of output motor 18. During the course of the execution of the algorithm, the computer averages the current torque T and the current speed w over a period of predetermined length. For example, the analog signals produced by transducers 20 and 22 are digitized at the rate of 800 points per second and are averaged over 40 ms. The averaged speed is differentiated with respect to time by differentiator 40 to produce an angular acceleration a. If transducer 20 produces a signal representing the displacement of shaft 16, the signal is averaged and differentiated twice to produce the angular acceleration. Summing junction 42 subtracts Tm from the current torque T and the difference produced is multiplied at 43 to produce the last term of equation (6). Similarly, the angular acceleration is multiplied at 44 by the multiplier ALa from equation (7) to produce the second term of equation (6).

Summing junction 46 subtracts these terms and produces an output, Tcor. The computer continuously updates the value of Told with the previously calculated value Tnew. Summing junction 48 adds the current value of Told and Tcor to produce Tnew.

After the correction torque Tcor is calculated, it is multiplied at 50 by a gain K whose value is experimentally determined using conventional techniques to minimize or avoid overshooting the desired output or commanded torque. The gain, which is stored in computer memory is multiplied by Tcor and is submitted to summing junction 52 where that value is added to Told. The value thereby calculated is stored in the computer memory location corresponding to Told 54.

The memory location 56, corresponding to Tnew, contains the most recent value for Tcor, and the memory location 54 contains a previously calculated value for Tcor.

Two additional corrections may be applied to the value of Tnew. The first of these compensates for the motor load characteristics as a function of current velocity, w. If, for example, a DC motor is employed, its field weakening can be compensated for when the operating speed of shaft 16 exceeds a predetermined value. The graph in block 58 illustrates that Tnew would not be corrected when rotational speed is low, but a linearly increasing correction can be applied to compensate for field weakening when the rotational speed of shaft 16 increases above a threshold speed. The correction represented by block 60 shows that the magnitude of Tc that is produced as a result of the calculated value Tnew can be clipped to a limit allowed by a digital-to-analog converter so that the commanded torque does not exceed an acceptable torque limit for the output motor.

Finally, the commanded torque calculated by this algorithm and corrected as described, is transmitted over line 30 to the motor drive of the output motor 18. Preferably, the digital output of the computer is converted to an analog voltage signal between −10 v and +10 v. This signal is converted within the motor drive to produce the output torque Tm that corresponds to the coordinates represented by point F of FIG. 3.

Having described the preferred embodiment of our invention, what we claim and desire to secure by U.S. Letters Patent is:

1. In a system for testing a component that carries a torque T and driveably connects an input motor and an output motor whose output torque opposes the output torque of the input motor and simulates the effect of a variable virtual inertia, Jvirtual, driven by the component, the method for producing a torque command for the output motor comprising:
   applying to the component the torques, Ti and Tm, produced respectively by the input motor and output motor;
   determining the current angluar acceleration, a, of the component and determining the current torque, Ti, transmitted by the component;
   determining the magnitude of the inertia, Ji, of the input motor and the magnitude of the virtual inertia;
   calculating a torque multiplier, $AL_T$, from the relationship $$AL_T = Ji/(Ji + Jvirtual);$$

calculating an acceleration multipler, $AL_a$, from the relationship $$AL_a = (Ji) \, Jvirtual/(Ji + Jvirtual);$$

calculating a current torque correction, Tcor, from the relationship $$Tcor = Al_a(a) - AL_T(T - Tm);$$

calculating a new torque command, Tc, equal to the sum of a previously calculated torque correction and the current torque correction; and
   transmitting to the output motor an electrical signal representing a new torque command.

2. A method controlling an output motor in a system having a component under test in which the output torque of the output motor opposes the output torque of the input motor, thereby simulating with the aid of a digital computer the effect of a variable virtual inertia, Jvirtual, driven by the tested component comprising:
   repetitively determining and supplying as input to the computer the torques produced by the input motor and output motor, respectively, the curent angular acceleration, a, of the component under test, the current torque Ti, transmitted by the component under test, and the virtual inertia to be simulated by the system;
   repetitively calculating in the computer at frequent intervals a torque mutliplier, $AL_T$, from the relationship $AL_T = Ji / (Ji + Jvirtual)$, an accelration mutliplier, $AL_a$, from the relationship $Al_a = (Ji) \, Jvirtual/(Ji + Jvirtual)$, a torque correction value, Tcor, from the relationship $$Tcor = Al_a(a) - AL_T(t - Tm);$$

a new toreque command equal to the difference between a previously calculated torque command and the current torque correction value;

transmitting to the output motor from the computer an electrical signal representing the current torque correction value, and producing a torque from the output motor in response to the transmitted current torque correction value signal, whereby the output motor torque is changed to simulate the effect of the virtual inertia.

3. The method of claim 1 wherein determining the current angular acceleration and the current torque transmitted by the component under test comprises averaging the current acceleration and the current torque transmitted by the component under test over a predetermined period of time.

4. The method of claim 2 wherein repetitively determining the current angular acceleration of the component and the current torque transmitted by the component includes the step of averaging said current acceleration and said current torque over a predetermined period of time.

5. The method of claim 1 further including:
determining an amount of proportional control, K, applied to Tcor to reduce the amount by which the output torque overshoots the new torque command;
adjusting Tcor by said amount of proportional control.

6. The method of claim 1 wherein calculatihng a new torque command further includes adjusting the current torque correction by compensating for motor field weakening in the output motor when the output motor is a dc motor.

7. The method of claim 1 wherein calculating a new torque command further includes limiting the new torque command to a value that limits the output motor torque within an acceptable range.

* * * * *